United States Patent Office 2,772,272
Patented Nov. 27, 1956

2,772,272

HETEROCYCLIC VAT DYESTUFFS

Wilhelm Schmidt-Nickels, Little York, N. J., and David I. Randall, Easton, Pa., assignors to General Aniline & Film Corporation, New York, N. Y., a corporation of Delaware No Drawing. Application December 28, 1954,
Serial No. 478,173

12 Claims. (Cl. 260—294.8)

This invention relates to the production of novel heterocyclic vat dyestuffs having the formula

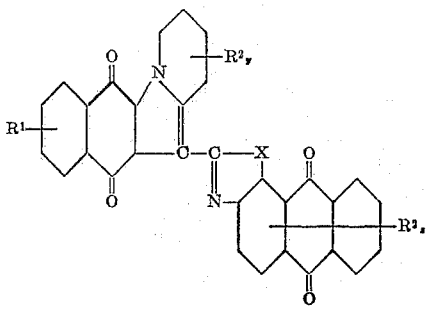

wherein $R^1$ is selected from the group consisting of hydrogen nitro, amino and halo; $R^2$ is selected from the group consisting of alkyl and halo; $R^3$ is selected from the group consisting of alkyl, alkoxy, nitro, amino and halo; X is selected from the group consisting of O, S, and NH; and y and z have values of 0 to 3.

It has been found that these compounds constitute a group of improved vat dyestuffs whcih produce bright red-orange to brown shades of good fastness to washing, chlorine and light when dyed and printed in the usual manner. The dyestuffs of this invention may be produced by the reaction of a 1,2-phthaloylpyrrocoline-3-carboxylic acid chloride of the formula

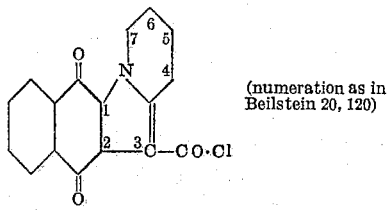

(numeration as in Beilstein 20, 120)

with a compound of the formula

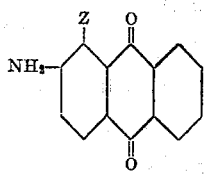

wherein Z is selected from the group consisting of SH, $NH_2$, and halogen such as chlorine or bromine. Where Z is SH or $NH_2$, a simultaneous ring closure and condensation with liberation of HCl takes place to yield the desired product of the instant invention. Where Z is halogen, the condensation or amidation takes place first to produce an intermediate which is cyclicized to the desired product by treatment with an alkali metal car- bonate and copper oxide, or other well known ring closing agent, preferably in an organic solvent.

It will be understood that in carrying out the foregoing reaction, the starting reactants may contain inert substituents which do not interfere with the desired reaction, such as nitro, alkyl, and/or alkoxy, to produce the corresponding substituted products. Halogenated derivatives are obtained by employing a halogenated anthraquinone reactant or by halogenation of the products produced herein. Amino substituded derivatives may be obtained by reduction of the corresponding nitro products. Thus, in the above generic formula, $R^1$, $R^2$ and/or $R^3$ may, when so indicated, represent alkyl such as methyl, ethyl, propyl, isopropyl or butyl or the like, alkoxy such as methoxy, ethoxy, propoxy, isoproproxy or butoxy, nitro, amino, chloro or bromo or the like. The 1,2-phthaloyl-pyrrocoline-3-carboxylic acid chloride is produced from the corresponding acid disclosed in the "Journal of Organic Chemistry" 19, 176, by treatment with thionyl chloride or other well known agent suitable for producing the acid chloride from the free acid.

Since the reaction involves liberation of HCl, it may be desirable to conduct the reaction in the presence of an acid acceptor such as inorganic alkalis like potassium or sodium hydroxide, or organic bases like pyridine or the like. However, in most cases it is preferable to carry out the reaction in a high boiling organic solvent or diluent at elevated temperatures ranging from about 190° to 220° C. with simultaneous volatilization of the HCl. As suitable reaction media, there may be mentioned nitrobenzene, trichlorobenzene, and other aromatic hydrocarbons and halogenated aromatic hydrocarbons. The reaction product is usually insoluble in the liquid medium employed for the reaction and the precipitate may be readily separated by filtration, washing and the like.

If desired, the vat dyestuffs of this invention may be converted into the alkali metal salts of the polysulfuric acid esters of their leuco forms by the usual known methods such as by treatment with a reducing agent or metal in pyridinechlorosulfonic acid solution, or by first reducing to the leuco compound and then esterifying in the normal way in an aqueous solution by the action of tertiary amine addition products of sulfur trioxide or in any other suitable manner, followed by treatment with a suitable sodium or potassium compound to produce the desired salt.

The dyestuffs of this invention may be employed for coloring, dyeing or printing film or fibrous material in any form and having a basis of natural or artificial polymeric material such as cotton or other natural cellulosic material, regenerated cellulose such as derived by the viscose or cuprammonium process or by saponification of cellulose esters, or other material capable of being colored by vat dyestuffs in soluble, dispersed or pigment form.

The following examples, in which parts are by weight unless otherwise indicated, are illustrative of preferred embodiments of this invention and are not to be regarded as limitative. Parts are in grams by weight, in cc. by volume.

Example 1

A charge of 75 parts by volume nitrobenzene, 2.6 parts by weight 1-chloro-2-aminoanthraquinone and 2.7 parts by weight 1,2-phthaloyl-pyrrocoline-3-carboxylic acid chloride was stirred at 200-205° C. for 2 hours. The reaction was filtered off at room temperature, washed with nitrobenzene, acetone and dried. It has the apparent formula:

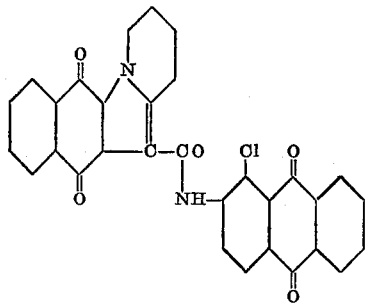

*Cyclization.* A charge of 40 parts by volume nitrobenzene, 3.2 parts by weight of the above product, 2.4 parts by weight anhydrous sodium carbonate and 0.02 parts of weight copper oxide was stirred at 210° C for 12 hours. The cyclization product was filtered off at room temperature, washed with nitrobenzene, acetone, water until neutral and dried. It has the apparent structure:

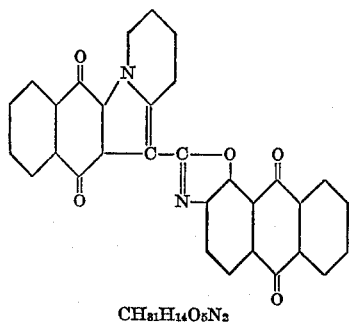

$C_{31}H_{14}O_5N_2$

Found: N=5.72%, Cl=O. Theory for $C_{31}H_{14}O_5N_2$: N=5.68%, Cl=O.

The compound dyes cotton from an alkaline hydrosulfite vat in bright red-orange shades of good fastness properties especially to chlorine and light.

*Example 2*

A charge of 30 parts by volume nitrobenzene, 2.2 parts by weight 1,2-phthaloyl-5-methylpyrrocoline-3-carboxylic acid (prepared in analogy to Journ. Org. Chem. 19, 176, using gammapicoline instead of pyridine) of the structure:

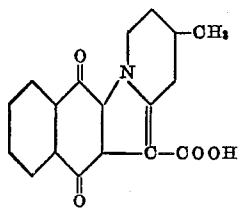

and 1 part by volume thionyl chloride was stirred at 160–170° C. for 1 hour to convert the acid into its chloride. After allowing the temperature to drop to 100° C., 0.9 parts by weight 1-chloro-2-aminoanthraquinone was added. Agitation was then continued at 200–205° C. for 2 hours. The reaction mixture was worked up as described in Example 1. The reaction product has the apparent structure:

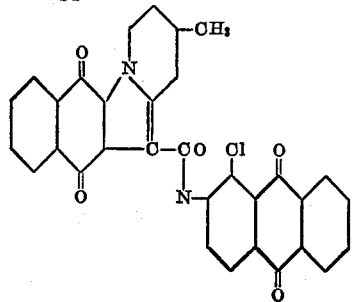

*Cyclization.*—A charge of 25 parts by volume nitrobenzene, 1.5 parts by weight of the above reaction product, 1.0 parts by weight anhydrous sodium carbonate and 0.02 parts by weight copper oxide was reacted and worked up as described in Example 1. The resulting dyestuff has the apparent structure:

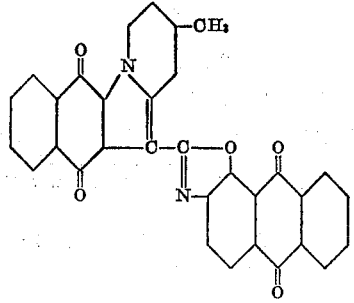

The product dyes red-orange, slightly more to the blue side against the dyeings of the compound of Example 1, and of the same good fastness properties.

*Example 3*

A charge of 40 parts by volume nitrobenzene, 3.8 parts by weight 1,2-phthaloyl-6(or 4)-methylpyrrocoline-3-carboxylic acid (prepared in analogy to Journ. Org. Chem. 19, 176, using beta-picoline instead of pyridine) of the structure:

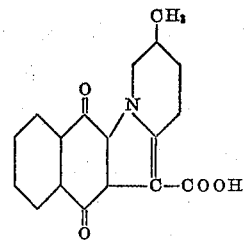

or

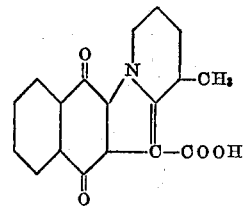

or a mixture thereof, and 1.8 parts by volume thionyl chloride was stirred at 160–170° C. for 1 hour. After addition of 3.2 parts by weight 1-chloro-2-aminoanthraquinone at 100° C. the experiment was continued as described in Example 1 leading to a compound of the apparent structure:

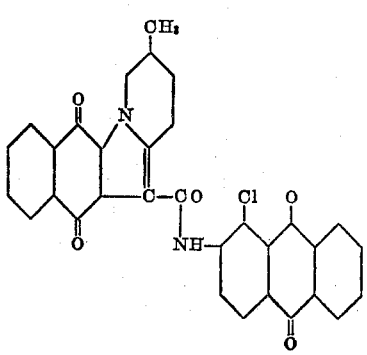

or

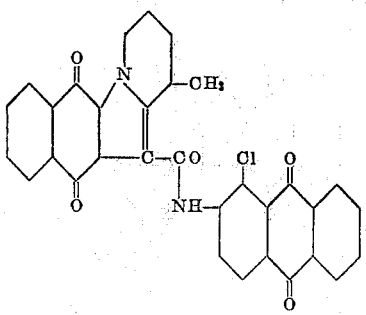

or a mixture thereof. The cyclization of this intermediate product was carried out as described in Example 1 with a charge of 50 parts by volume nitrobenzene, 4.2 parts by weight of the said intermediate product, 2.9 parts by weight anhydrous sodium carbonate and 0.02 parts by weight copper oxide.

The resulting product has the apparent structure:

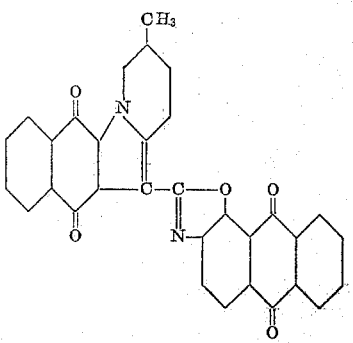

or

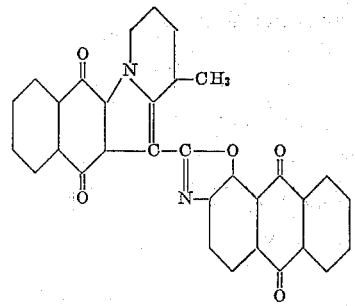

or a mixture thereof. The product dyes red-orange a little more to the bluish side against the dyeings of the compound of Example 1, and of the same good fastness properties.

Example 4

A charge of 30 parts by volume nitrobenzene, 2.0 parts by weight of the dyestuff of Example 1, $C_{31}H_{14}O_5N_2$, 0.8 parts by volume bromine and 0.1 parts by weight iodine was stirred at 150–160° C. for 4 hours. The brominated dyestuff was filtered off at room temperature, washed with nitrobenzene, alcohol, water until neutral and dried.

Found: Br=23.53%. Theory for a compound with 2 bromine atoms in the molecule, $C_{31}H_{12}O_5N_2Br_2$: Br=24.54%.

The product dyes similar red-orange shades as the dyestuff of Example 1, and of the same good fastness properties.

Example 5

A charge of 100 parts by volume trichlorobenzene, 8.3 parts by weight 1,2-phthaloyl-pyrrocoline-3-carboxylic acid and 4.1 parts by volume thionyl chloride was stirred at 160–170° C. for 1 hour. After allowing the temperature to drop to 100° C., 45 parts by volume trichlorobenzene and 7.3 parts by weight 1-mercapto-2-aminoanthraquinone were added. Agitation was continued at 200– 205° C. for 2 hours. The reaction product was filtered off at room temperature, washed with trichlorobenzene, acetone, water until neutral and dried. It has the apparent structure:

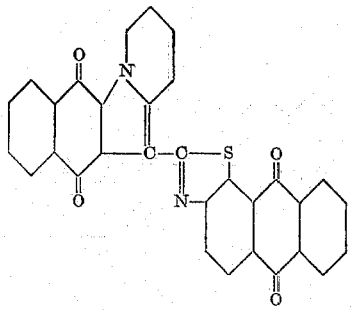

The compound dyes cotton from an alkaline hydrosulfite vat strong red-brown shades of good fastness properties.

Example 6

A charge of 40 parts by volume trichlorobenzene, 2.4 parts by weight 1,2-phthaloyl-5-methylpyrrocoline-3-carboxylic acid and 1.1 parts by volume thionyl chloride was stirred at 160–170° C. for 1 hour. After allowing the temperature to drop to 100° C., 2.0 parts by weight 1-mercapto-2-aminoanthraquinone was added. Stirring was continued at 200–205° C. for 2 hours. The reaction mixture was worked up as described in Example 5. The resulting dyestuff has the apparent structure:

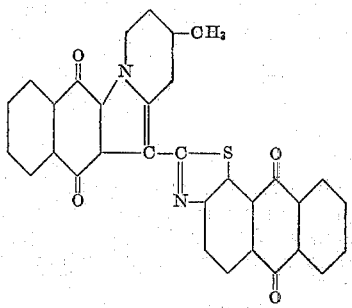

The product dyes red-brown shades, a little more to the bluish side against the dyeings of the compound of Example 5.

Example 7

A charge of 75 parts by volume nitrobenzene, 2.4 parts by weight 1,2-diaminoanthraquinone and 2.7 parts by weight 1,2-phthaloyl-pyrrocoline-3-carboxylic acid chloride was stirred at 200–205° C. for 2 hours. The reaction product was filtered off at room temperature, washed with nitrobenzene, acetone and dried. It has the apparent structure:

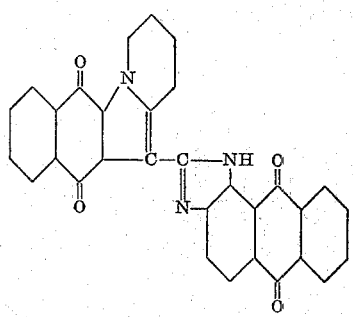

The product dyes cotton brown shades, much yellower against the dyeings of the product of Example 5.

This invention has been disclosed with respect to certain preferred embodiments, and various modifications and variations thereof will become abvious to the person skilled in the art. It is to be understood that such modifications and variations are to be included within the spirit and purview of this application and the scope of the appended claims.

We claim:
1. A dyestuff having the formula

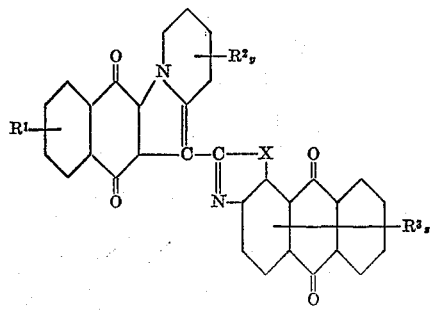

wherein $R^1$ is selected from the group consisting of hydrogen nitro, amino and halo; $R^2$ is selected from the group consisting of lower alkyl and halo; $R^3$ is selected from the group consisting of lower alkyl, lower alkoxy, nitro, amino and halo; X is selected from the group consisting of O, S and NH; and y and z have values of 0 to 3.

2. In a process for producing a dyestuff as defined in claim 1, the step comprising reacting by heating a 1,2-phthaloyl-pyrrocoline-3-carboxylic acid chloride having the formula

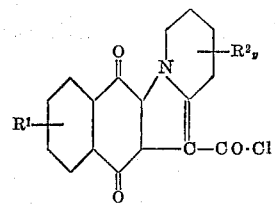

wherein $R^1$ is selected from the group consisting of hydrogen, nitro, amino and halo, $R^2$ is selected from the group consisting of lower alkyl and halo, and y has a value of 0 to 3 with a 2-aminoanthraquinone having the formula

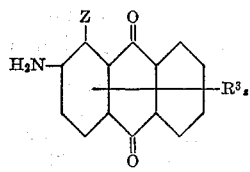

wherein Z is selected from the group consisting of SH, $NH_2$, and halo, $R^3$ is selected from the group consisting of lower alkyl, lower alkoxy, nitro, amino and halo, and z has a value of 0 to 3.

3. A dyestuff of the formula

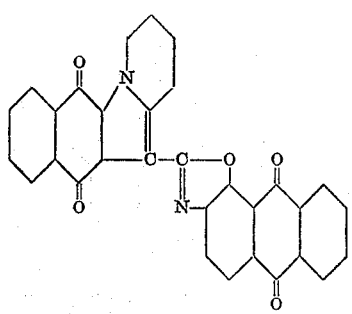

4. A process for producing a dyestuff as defined in claim 3 comprising reacting by heating 1-chloro-2-aminoanthraquinone with 1,2-phthaloyl-pyrrocoline-3-carboxylic acid chloride and subjecting the resulting product to the action of a ring-closing agent.

5. A dyestuff of the formula

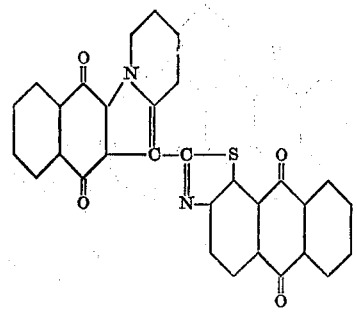

6. A process for producing a dyestuff as defined in claim 5 comprising reacting by heating a 1-mercapto-2-aminoanthraquinone with 1,2-phthaloyl-pyrrocoline-3-carboxylic acid chloride.

7. A dyestuff of the formula

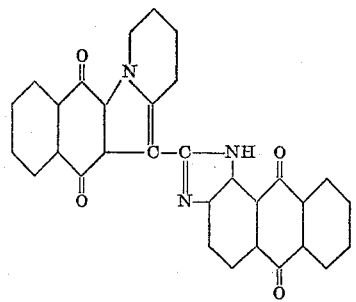

8. A process for producing a dyestuff as defined in claim 7 comprising reacting by heating 1,2-diaminoanthraquinone with 1,2-phthaloyl-pyrrocoline-3-carboxylic acid chloride.

9. A dyestuff of the formula

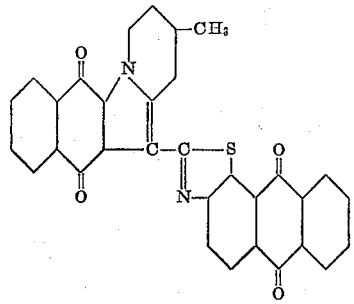

10. A process for producing a dyestuff as defined in claim 9 comprising reacting by heating 1-chloro-2-aminoanthraquinone with 1,2-phthaloyl-5-methylpyrrocoline-3-carboxylic acid chloride and subjecting the resulting product to the action of a ring-closing agent.

11. A dyestuff of the formula

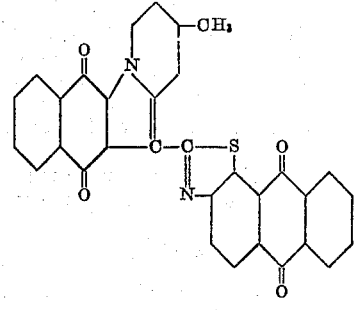

12. A process for producing a dyestuff as defined in claim 11 comprising reacting by heating 1-mercapto-2-aminoanthraquinone with 1,2-phthaloyl-5-methylpyrrocoline-3-carboxylic acid chloride.

No references cited.